(12) United States Patent
Chang et al.

(10) Patent No.: US 7,835,233 B2
(45) Date of Patent: Nov. 16, 2010

(54) DISC AUTOLOADER AND DUPLICATOR HAVING ONE-DIMENSIONAL ROBOTIC ARM MOVEMENT

(75) Inventors: Shuo Wei Chang, Alhambra, CA (US); Yi Wei, Alhambra, CA (US)

(73) Assignee: Vinpower, Inc., Alhambra, CA (US)

( * ) Notice: Subject to any disclaimer, the term of this patent is extended or adjusted under 35 U.S.C. 154(b) by 305 days.

(21) Appl. No.: 12/188,989

(22) Filed: Aug. 8, 2008

(65) Prior Publication Data

US 2010/0037245 A1    Feb. 11, 2010

(51) Int. Cl.
*H05K 7/20* (2006.01)
(52) U.S. Cl. ............................ 369/30.34; 361/679.39; 361/724; 361/727; 720/601
(58) Field of Classification Search ............ 361/679.37; 720/601; 369/30.34, 84
See application file for complete search history.

(56) References Cited

U.S. PATENT DOCUMENTS

| | | | | |
|---|---|---|---|---|
| 5,036,503 A | * | 7/1991 | Tomita | 369/30.43 |
| 5,914,918 A | * | 6/1999 | Lee et al. | 369/30.32 |
| 6,141,298 A | * | 10/2000 | Miller | 369/30.33 |
| 6,208,612 B1 | * | 3/2001 | Miller | 369/30.19 |
| 6,246,655 B1 | * | 6/2001 | Miller | 369/84 |
| 6,532,198 B1 | * | 3/2003 | Miller | 369/30.43 |
| 6,822,932 B2 | * | 11/2004 | Miller | 369/30.31 |
| 2004/0057347 A1 | * | 3/2004 | Lee | 369/30.32 |
| 2005/0068878 A1 | * | 3/2005 | Itoh et al. | 369/84 |
| 2007/0165496 A1 | * | 7/2007 | Liu et al. | 369/30.19 |
| 2007/0286049 A1 | * | 12/2007 | Sasaki | 369/84 |

* cited by examiner

*Primary Examiner*—Jayprakash N Gandhi
*Assistant Examiner*—Anthony Q Edwards
(74) *Attorney, Agent, or Firm*—Jen-Feng Lee

(57) ABSTRACT

The present invention relates to design and construction of a mini and compact optical disc autoloader. By way of a flip-flop device positioned and pivoted between two disc trays, the robotic arm movement is simplified to a one-dimensional linear fashion and greatly reduces the cost of production and also cost of maintenance. The present invention also allows for multiple write drives to be easily built into present invention, creating an efficient duplicating system. It can be used for the home and small business environment for small volume optical duplication, storage and management.

7 Claims, 10 Drawing Sheets

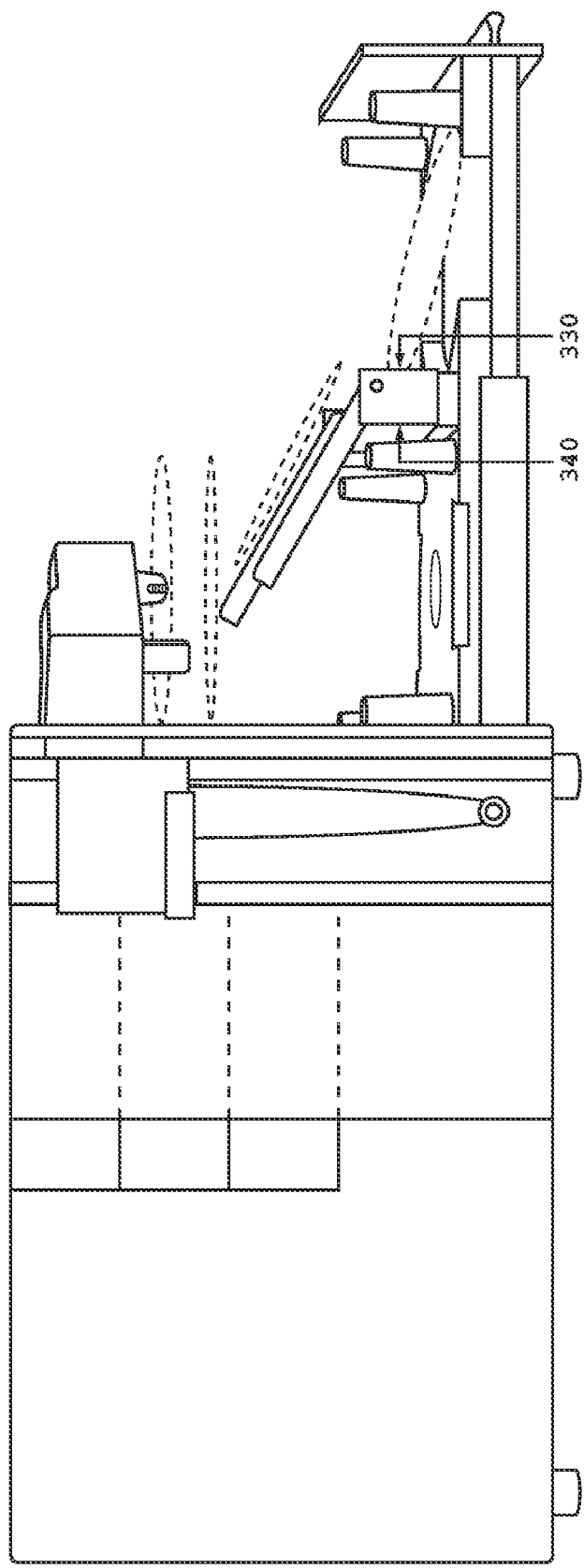

DISC AUTOLOADER AND DUPLICATOR HAVING ONE-DIMENSIONAL ROBOTIC ARM MOVEMENT

FIELD OF THE INVENTION

The present invention relates to design and construction of a mini and small-sized optical disc autoloader. By way of a flip-flop device positioned and pivoted between two disc trays, the robotic arm movement is simplified to a linear fashion and greatly reduces the cost of production and also cost of maintenance. It can be used for the home and small business environment for small volume optical duplication, storage and management.

BACKGROUND OF THE INVENTION

The optical disc, including the formats such as CD, DVD, HD-DVD, Blu-Ray Disc etc., are more and more popular for data storage and exchanging today. From CD music, DVD movie, digital photo, to business document and computer software, the optical disc are widely used in business and personal life. People often need to duplicate multiple disc as gifts to their friends, or memo to their business partner, or just as a backup. However, the only equipment which can be used today in home and office is the personal computer (PC), and it can burn, normally, one disk a time. So if multiple duplication disc are needed, someone has to repeatedly pick up and insert the discs manually.

On the other hand, users in the media production industry can resort to professional autoloader machines to handle the large volume duplication job (hundreds to thousands, or even millions). Examples for large volume duplication include the prior art of Lee et al. U.S. Pat. No. 5,914,918, Miller U.S. Pat. No. 6,141,298, Miller U.S. Pat. No. 6,208,612, Miller U.S. Pat. No. 6,532,198, and Miller U.S. Pat. No. 6,822,932. There is a gap between the large volume duplication job and single duplication job by PC.

Although, several products in the marketing can be used as alternative ways to fill the gap, all of them have their limitations. For example, the duplication tower with multiple writer drives in a stack can burn multiple discs at a time. But it requires constant human intervention to manually pick up and feed in optical discs.

With the changing demands for the small volume duplication autoloader, the reusability and expansibility has become more and more important and a key factor in software and mechanical development practice. In this invention, the design structure can be extended from one write drive to multiple drives in a stack, and the capacity of each slot in the drawer can be extended further. But the design concept, outlook, and most of the key components will remain consistent within these extended versions.

Most optical disc copiers today need to be hooked up with computers. Their operations are complicated, as a result. Present invention envisions the design and construction of an optical disc copier/loader to be a stand-alone system with easy user interface. However, at the same time, this invention can easily connect with PC through cable such as USB cable, so that users can access the built-in hard drive and other resources bundled to a PC in this invention.

The storage of optical disc before or after the duplication is another concern for the users. In this invention, the drawer (containing two trays) can be used as the working platform when it is pulled out and at the same time, can be used as an extra storage when it is pushed in.

OBJECTS AND SUMMARY OF THE INVENTION

This invention is designed for the small volume duplication job in home and office. The design of the whole system is pretty compact and thus attractive to be placed in the home and office environment. The invention allows a simple, one-dimensional (linear) robotic arm movement, reducing cost and potential mechanical problems often associated with other 2- or 3-dimensinal counterparts. The invention allows the expansion for multiple write drives in a stack, thus improving efficiency of duplication task. It can work with PC commonly found on the market, or it can work in a standalone fashion. Finally, it can be used as an extra storage for the optical discs when it is not in working

BRIEF DESCRIPTION OF THE DRAWINGS

FIG. 3C illustrates the sequential movements of a disc when dropped from the picker head and sliding towards the outer tray.

DETAILED DESCRIPTION OF THE PREFERRED EMBODIMENT

FIGS. 1A through 1D show the basic construction of a duplicator pursuant to the disclosure of present invention where a drawer 1-3 can be pulled out to reveal an outer tray 3-3 (closer to the person pulling out the drawer 1-3) and an inner tray 3-4 (closer to the main tower body). The two trays' relative position can be seen in FIG. 3A.

The main tower body 1-1 has a robotic arm 1-5 (with picker head 1-55) that travels up and down in a vertical track 1-2, controlled by a controller and motor unit 3-8. As can be seen by the explanation that follows about the structure of the flip-flop 2 and its position, present invention simplifies the mechanical design of robotic arm 1-5 to a one-dimensional mechanism and reduces the complexity and thus the probability of mechanical errors, as compared to more common 2-dimesional or even 3-dimensional counterparts.

A drawer 1-3 at the base of said main tower body 1-1 can be pulled out from the front surface. It contains an inner tray 3-4 and an outer tray 3-3.

On top of said drawer 1-3 is a harddrive 3-5. On top of said harddrive 3-5 is a write drive 3-6. Due to the simple and efficient design of present invention, manufacturers of present invention can easily put in more than one write-drive 3-6, vertically on top of one another, leaving the very top space inside said main tower body for the motor and controller unit 3-8.

Although FIGS. 3A-3D show only one write-drive 3-6, more of such write-drive 3-6 can be put in, as stated herein between harddrive 3-5 and motor and controller unit 3-8.

Two vertical walls are formed, separating the inner tray 3-4 and outer tray 3-3. The two walls are next to each other, as shown in FIGS. 3A through 3D, the one being closer to outer tray is vertical wall 330 and the one being closer to inner tray is 340. The walls 330 and 340 serve to align the position of the discs, whereby blank discs will reside in inner tray 3-4 and completed discs will reside in outer tray 3-3.

The walls 330 and 340 also serve to create the desired angle for the flip-flop 2 to work as a "slide chute" for completed disc to slide down into outer tray 3-4, when released from the picker head 1-55 of the robotic arm 1-5.

Figure 2A:
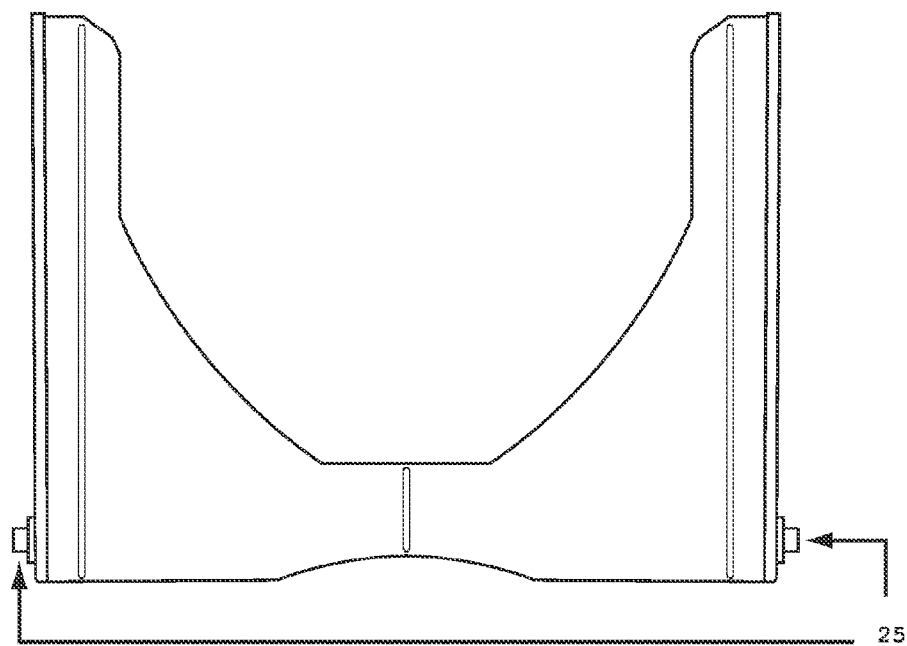
FIG. 2A shows the front view of the flip-flip having protrusions at bottom (solid) end.
Figure 2B:
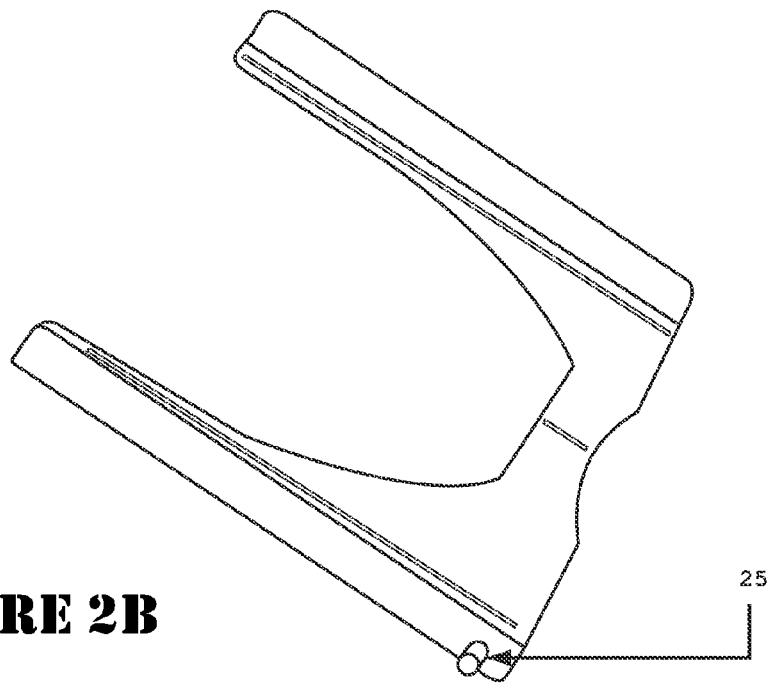
FIG. 2B shows the side/perspective view of protrusions on the solid end as connector to vertical wall of outer tray.

The flip-flip 2 is generally a square piece having an open end and a solid end, where the open end has a U-shaped cutout, as shown in FIGS. 2A and 2B. The bottom of the solid end has protruding connectors 25 on both sides, so that the flip-flop 2 is pivotally hinged near the top of the outer vertical wall 330.

The two sides near the top of outer wall 330 will have corresponding holes, to allow manual pivoting of said flip-flip 2.

Figure 3A:
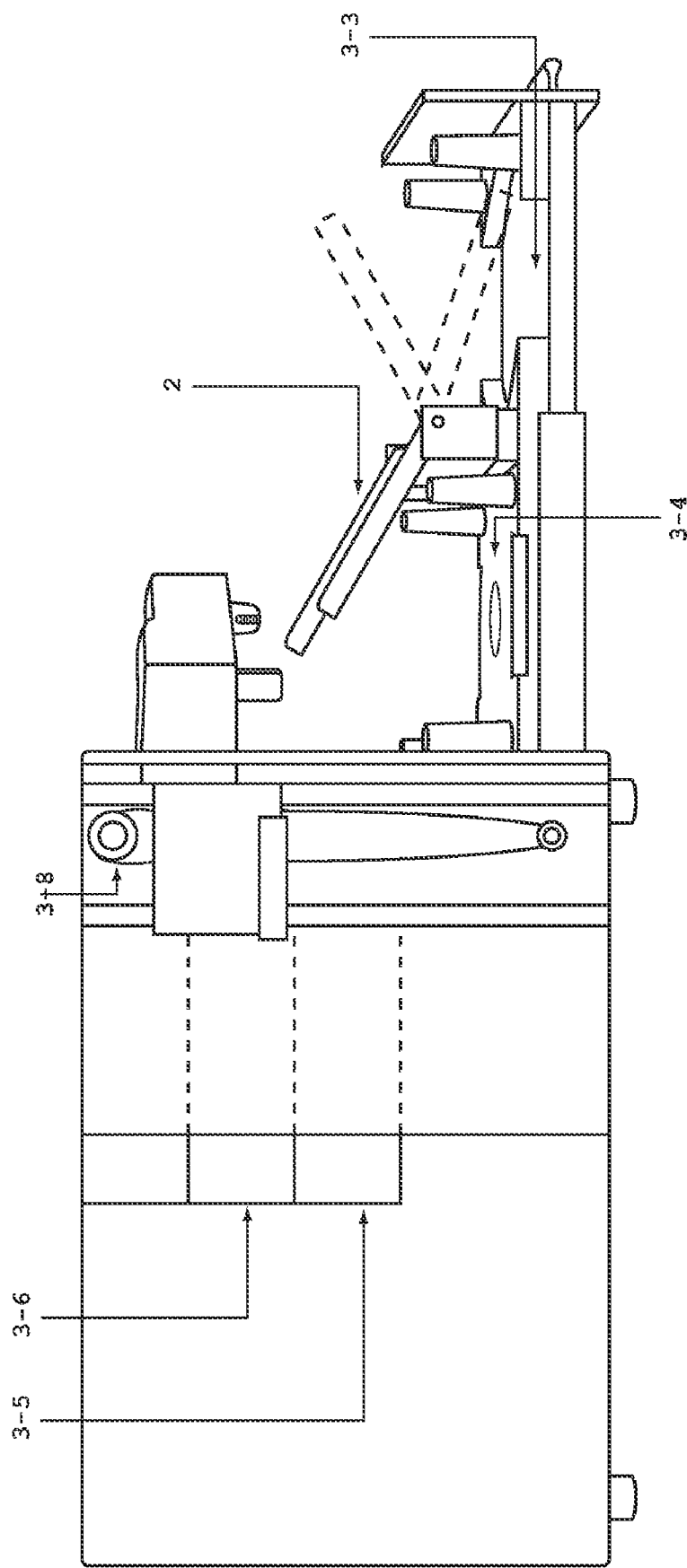
FIG. 3A shows the duplicator's intended action.

Flip-flop 2 has a down-resting position, as shown in FIG. 3A, where the tip of the open end touches the top of the stack of completed disc, or the bottom of outer tray 3-3, if empty.

Figure 3B:
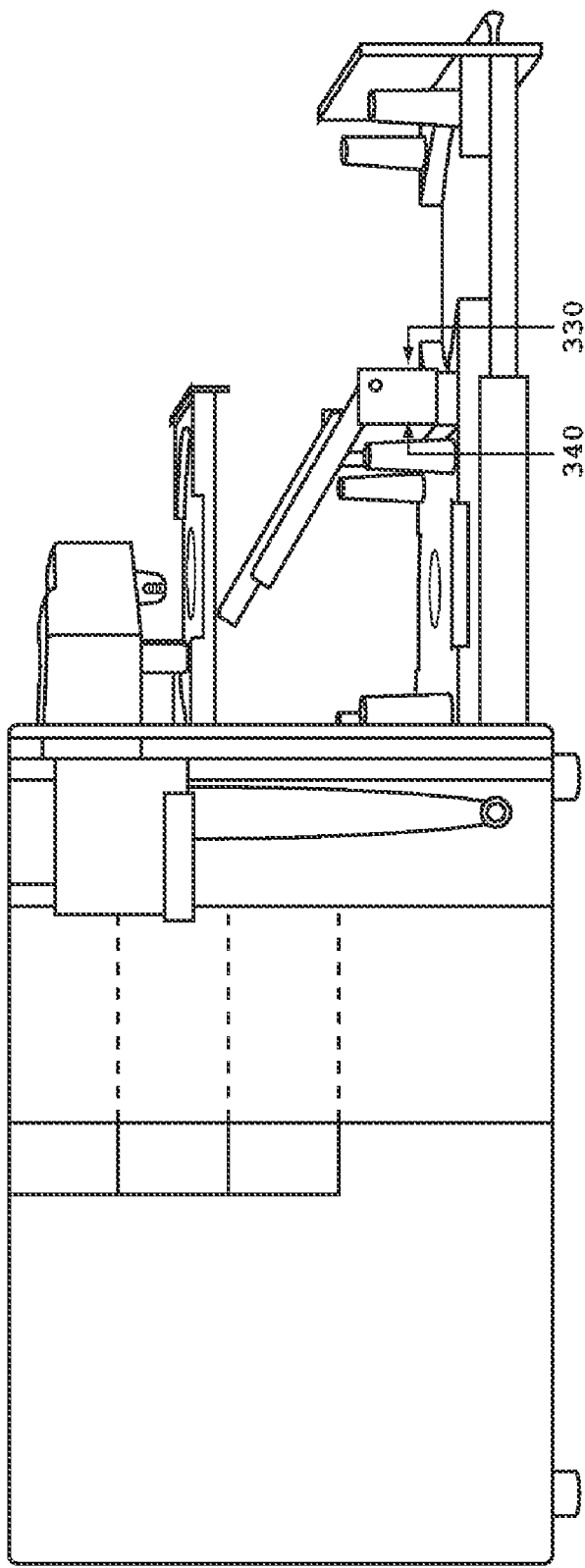
FIG. 3B indicates when the picker head is about to pick up a completed disc from the write drive tray and ready to drop it down to the flip-flop which is set in the flip-up position.

Flip-flop 2 has a flip-up position, as shown in FIGS. 3A through 3C, where an angle is formed when the inner vertical wall 340 is propping up the under side of flip-flop 2, creating the angle for the disc to slide down into outer tray 3-3, when released from the picker head 1-55 of the robotic arm 1-5.

Figure 3D:
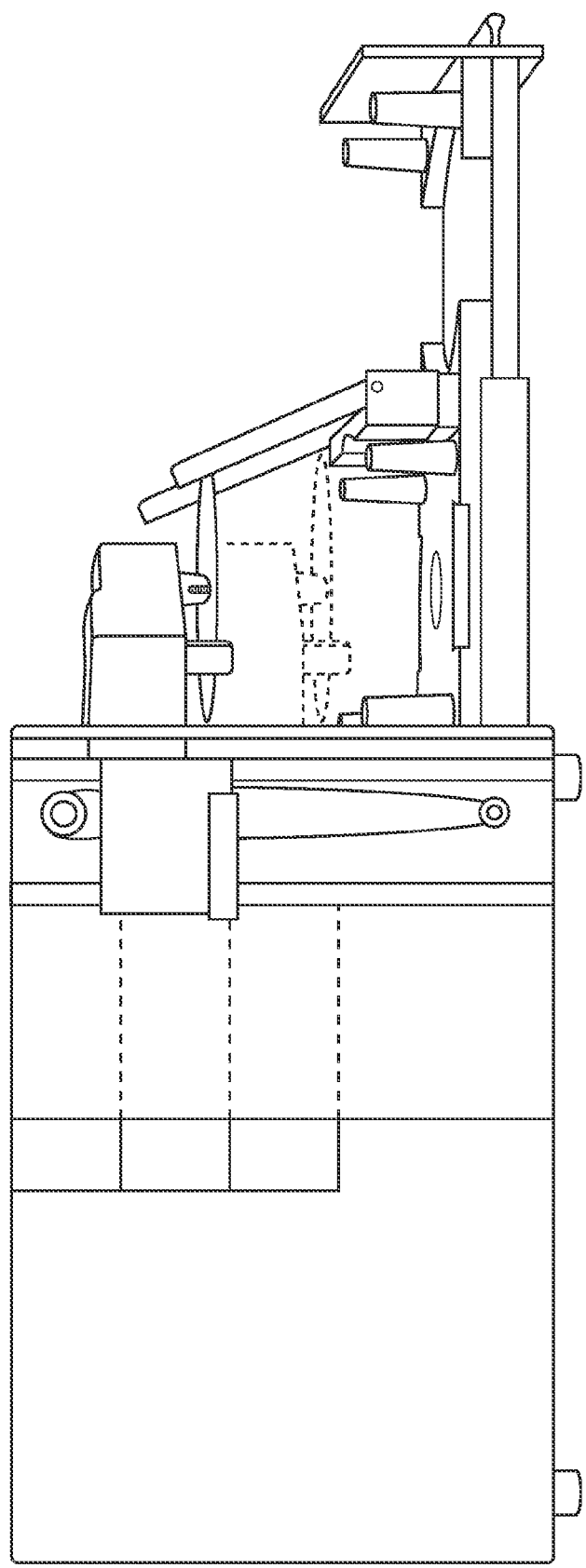
FIG. 3D illustrates the flip-flop in a flip-temp position when pushed away by the disc being grasped by the picker head.
Figure 3E:
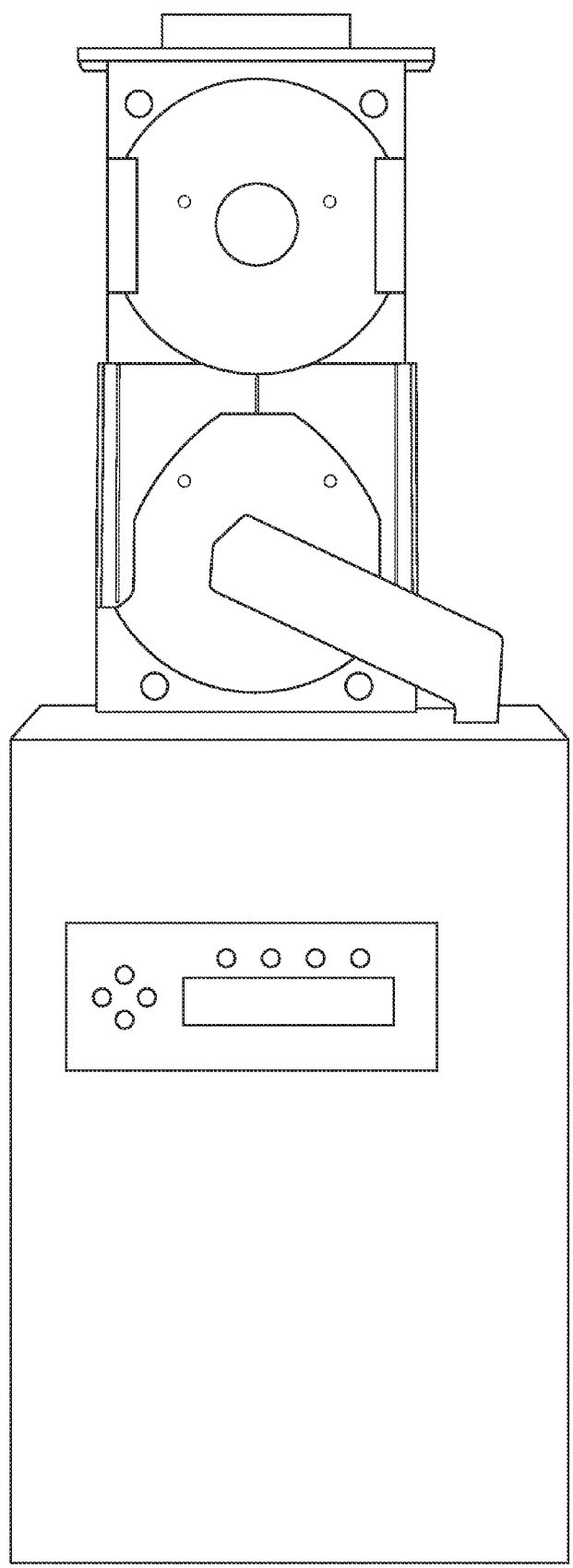
FIG. 3E shows the vertical top-down view of present invention. The picker head of the robotic arm can move in a simple one-dimensional linear action up and down through the U-shaped cutout of the flip-flop.

By way of the structural position of flip-flop 2, it has a further flip-temp status, as shown in FIG. 3D, which has an angle higher than that of the flip-up position, where the motion of the robotic arm picking up a blank disc from the inner tray 3-4 will lift the flip-flop 2 from the flip-up position to a flip-tem status, as a result of the circular edge of said blank disc propping against the under side of said flip-flop, until the blank disc finishes its vertical travel to the top of its position. At that time, there is no more propping up force to keep the flip-flop 2 in the flip-temp status and it gravitates back down to the flip-up position, forming the angle for disc to slide down, as described in previous paragraph.

The robotic arm up-and-down movement is controlled by sensors and the writer drive 1-2 position in/out control implemented by the motor and controller unit 3-8.

Figure 1A:
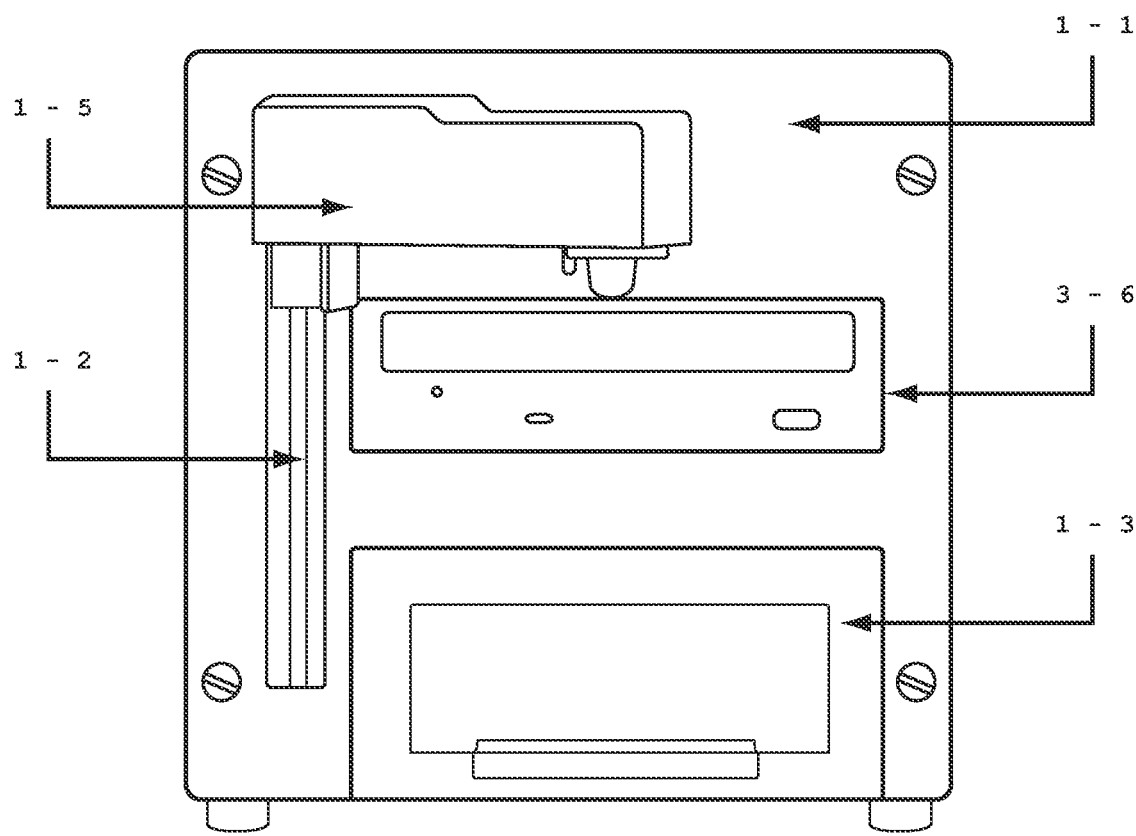
FIG. 1A illustrates the front view of a basic construction of present invention.
Figure 1B:
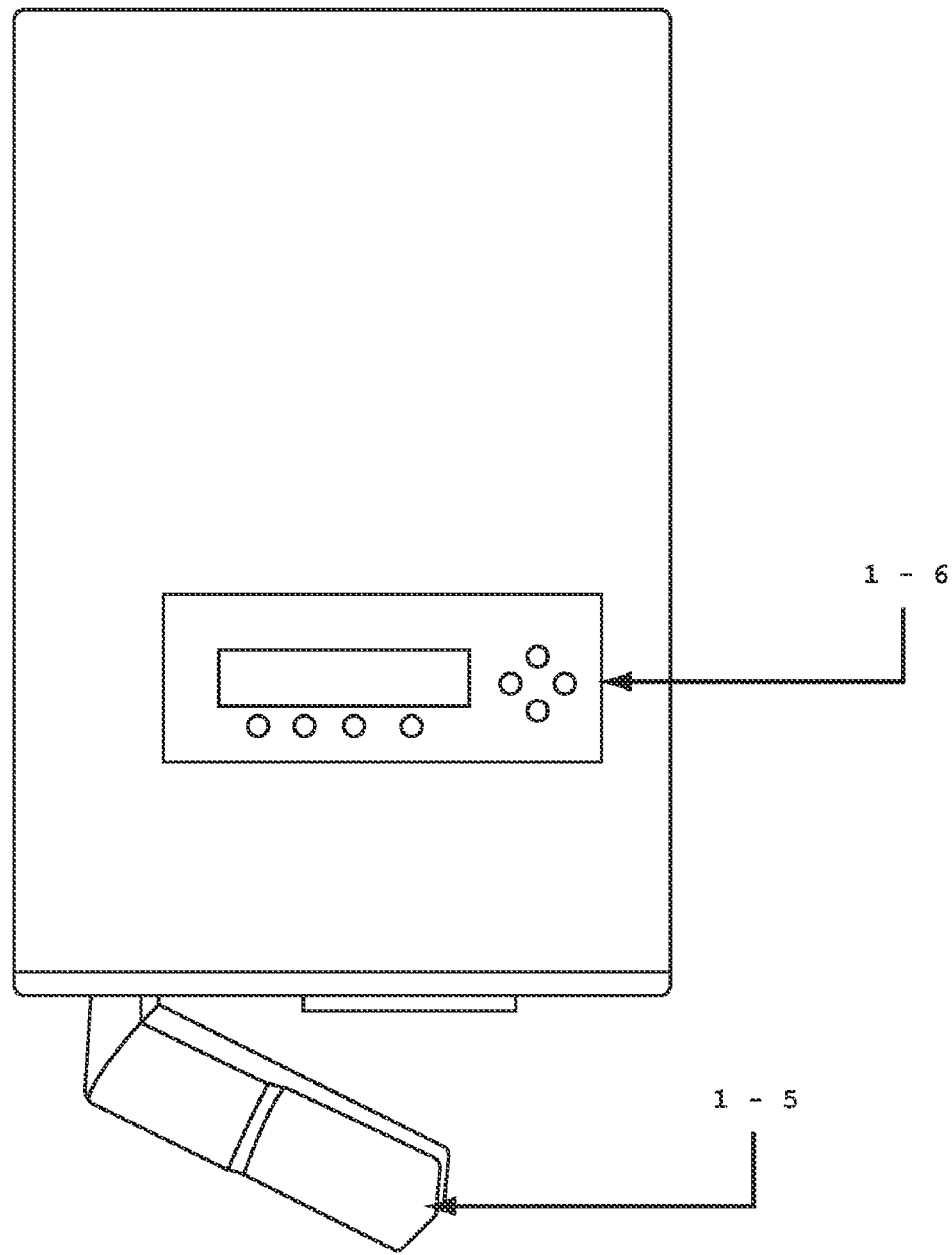
FIG. 1B illustrates the top view of a basic construction of present invention.
Figure 1C:
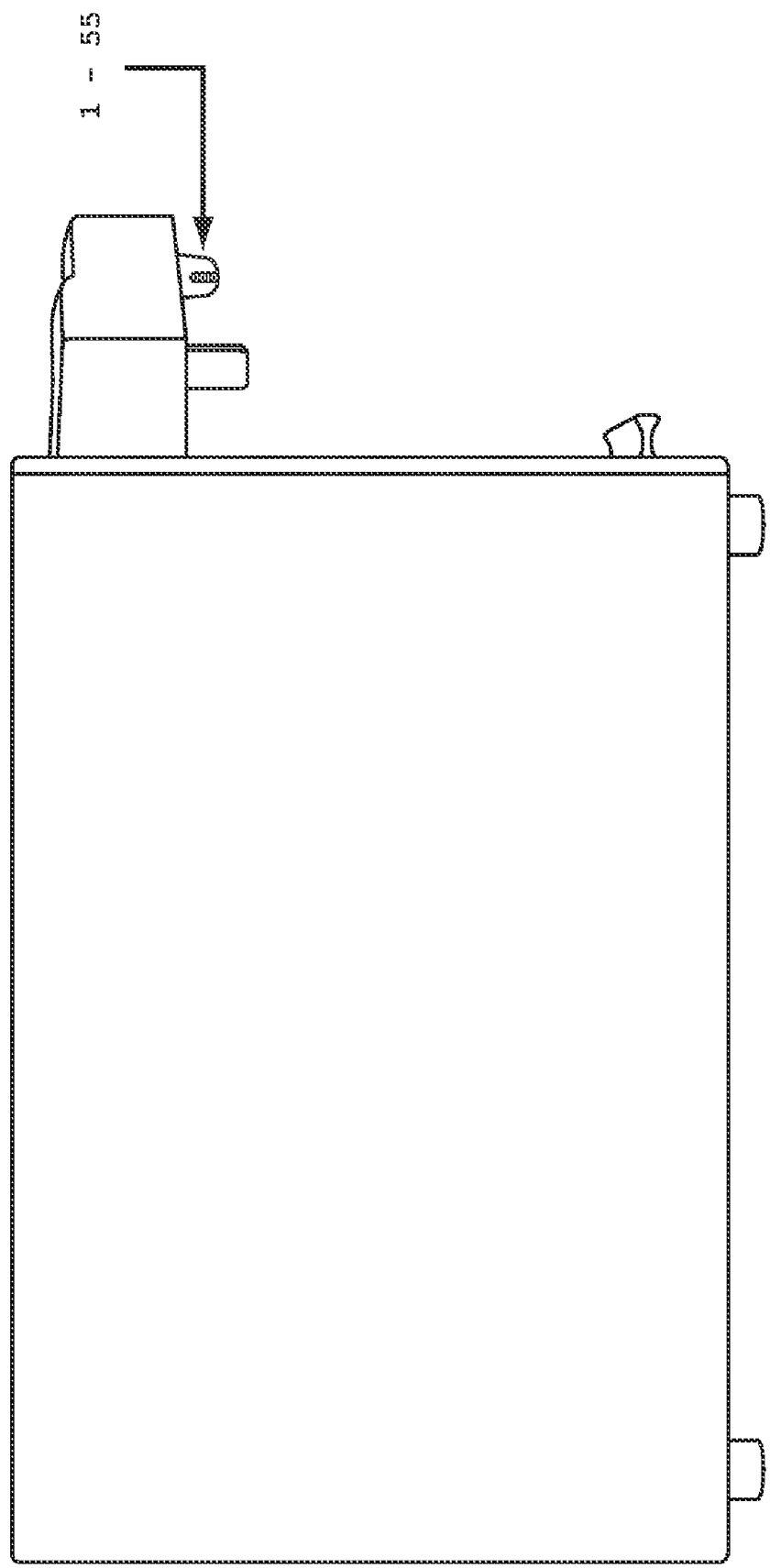
FIG. 1C shows the side view of a basic construction of present invention.
Figure 1D:
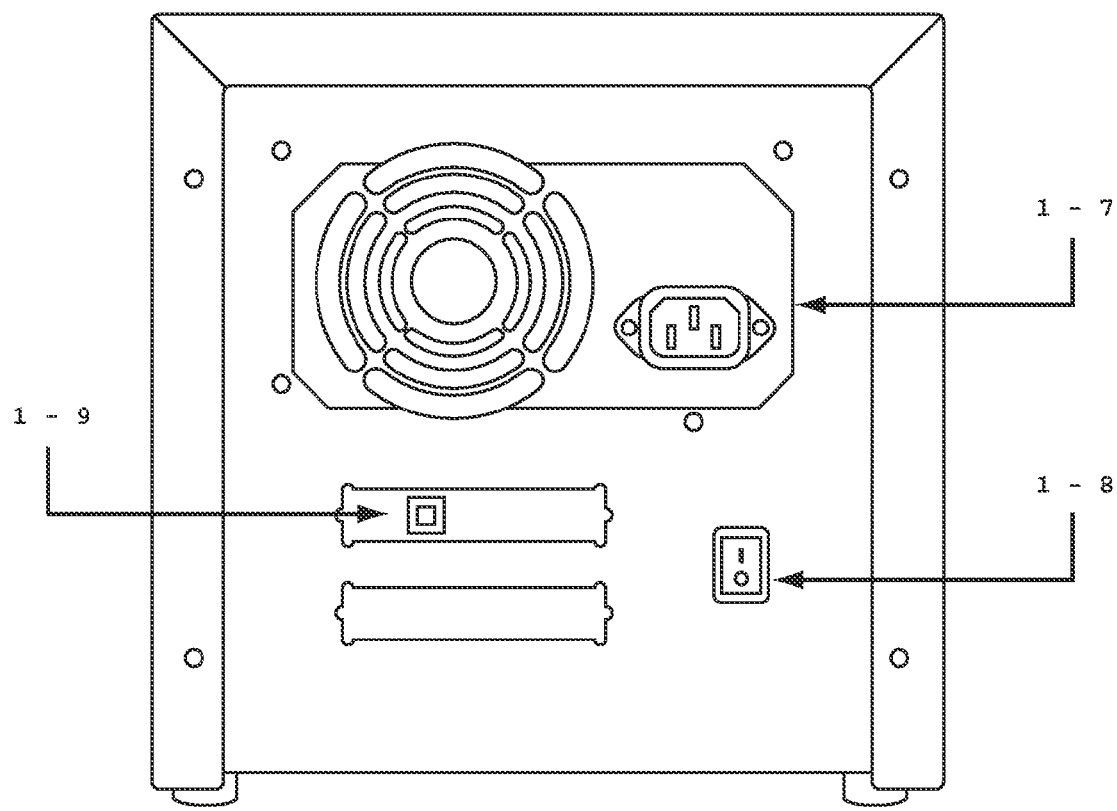
FIG. 1D shows the back view of a basic construction of present invention.

On the top surface of main tower body, a user interface with LCD screen 1-6 is located, serving as a means for manual operation and for status readout, as shown in FIG. 1B. A USB cable port 1-9 is shown in the back view, FIG. 1D, for connection to PC or other USB-enabled devices. The built-in harddrive 3-5, along with the LCD interface 1-6, allows user to have versatile control of disc duplication with pre-determined effect or sequence.

In this invention, the stepper motor or servo motor used on the robotic arm 1-5 is known art and is not needed for inclusion into the disclosure. In addition, sensor and motor control module for the movement of the robotic arm 1-5 and the picker head 1-55 are also part of the currently available prior art and not disclosed, nor forming part of the claimed invention in present application.

The invention claimed is:

1. A disc duplicator comprising:
    a main tower body having built-in power supply unit;
    a user interface with LCD screen on the top side of said main tower body;
    a controller and motor unit situated inside and near the top of said main tower body;
    a write drive below said controller and motor unit;
    a harddrive below said write drive;
    a USB port at back of said main tower body;
    a drawer at bottom of said main tower body that can be pulled out and further having one inner tray and one outer tray with two vertical walls adjacent to each other, separating the two tray areas;
    a flip-flop having a bottom end pivotably hinged to the top of the wall of the outer tray; and,
    a robotic arm with a built-in grab/release picker head that moves along an up-down linear track, so that at the beginning of a duplication session, the flip-flop is flipped to lean against the vertical wall of the inner tray, and the remaining duplication process becomes automatic without any human intervention.

2. The duplicator of claim 1, wherein said flip-flop has a solid end and a open end where a U-shaped cutout allows the picker head of the robotic arm to pass through in the up-down linear fashion, when said flip-flop is in the flipped up position resting on the vertical wall of the inner tray, allowing the blank disc grabbed on by the robotic arm to push up said flip-flop to a flip-temp status that has an angle higher than that of the flip-flop resting at the flip-up position.

3. The duplicator of claim 2, wherein said flip-flop has bottom connectors on the solid end of for pivotally attaching to the top of said vertical wall of the outer tray.

4. The duplicator of claim 3, wherein said vertical walls of the two tray areas are set to approximately same height, resulting in the flip-flop to have a down-resting position and a flip-up position, whereby the angle at flip-up position allows a disc to slide towards the outer tray when the write head releases a disc after the write drive tray is fully retracted into the main tower body.

5. The duplicator of claim 4, wherein additional write drives are fitted into the room above said harddrive, along with the proportional total height adjustment of main tower body and the proportional length of the up-down linear track for the robotic arm to travel.

6. The duplicator of claim 4, where a cooling fan is placed near the back of said main tower body, to provide air circulation and heat dissipation.

7. The duplicator of claim 6, wherein the bottom connectors of said flip-flop are a pair of dowels on two sides of said flip-flop, with the top of outer wall having corresponding holes for insertion, allowing manual pivoting of said flip-flop.

* * * * *